US012621594B2

(12) United States Patent
Yoshino

(10) Patent No.: US 12,621,594 B2
(45) Date of Patent: May 5, 2026

(54) MICROPHONE DEVICE

(71) Applicant: Audio-Technica Corporation, Tokyo (JP)

(72) Inventor: Satoshi Yoshino, Tokyo (JP)

(73) Assignee: Audio-Technica Corporation, Tokyo (JP)

( * ) Notice: Subject to any disclaimer, the term of this patent is extended or adjusted under 35 U.S.C. 154(b) by 135 days.

(21) Appl. No.: 18/602,223

(22) Filed: Mar. 12, 2024

(65) Prior Publication Data

US 2024/0348959 A1 Oct. 17, 2024

(30) Foreign Application Priority Data

Apr. 13, 2023 (JP) ................................ 2023-065916
Jan. 23, 2024 (JP) ................................ 2024-007987

(51) Int. Cl.
*H04R 1/08* (2006.01)
*H04R 1/34* (2006.01)

(52) U.S. Cl.
CPC ............ *H04R 1/086* (2013.01); *H04R 1/342* (2013.01); *H04R 2410/07* (2013.01)

(58) Field of Classification Search
CPC ...... H04R 1/086; H04R 2410/07; H04R 1/08; H04R 1/38
See application file for complete search history.

(56) References Cited

U.S. PATENT DOCUMENTS 2,536,261 A * 1/1951 Caldwell, Jr. .......... H04R 1/086 381/346
4,625,827 A * 12/1986 Bartlett .................. H04R 1/086 181/158

FOREIGN PATENT DOCUMENTS

JP 2012-175379 A 9/2012

* cited by examiner

*Primary Examiner* — Kile O Blair
(74) *Attorney, Agent, or Firm* — WCF IP

(57) ABSTRACT

Provided is a microphone device with a reduced impact on a windscreen (a windscreen part) caused by an installed environment. The microphone device includes a microphone that outputs an electrical signal in response to a sound wave, a housing portion that accommodates the microphone, and a windscreen part that reduces a pressure of wind caused by the wind entering into the housing portion. The housing portion includes a hollow cylindrical housing body and a cap attached to one end of the housing body in the axial direction of the housing body. The windscreen part is accommodated in the housing body and disposed between the cap and the microphone. The cap is solid. The cap includes a sound guide hole that guides the sound wave to the microphone. The sound guide hole is disposed along the axial direction.

13 Claims, 5 Drawing Sheets

MICROPHONE DEVICE

FIELD

The present invention relates to a microphone device.

BACKGROUND

Microphone devices include a microphone device for security purpose that is installed outside a building (e.g., near an entrance of the building) and is used for picking up sounds (sound waves) emitted by people entering and leaving the building.

Such a microphone device is to pick up sounds reliably for security reasons. However, wind noise may occur as wind hits the microphone device in an environment where the microphone device is exposed to wind and rain outside the building. In some cases, electric noise may also occur as wind hits a diaphragm of the microphone unit. Such wind noise may be picked up by the microphone. When the wind noise is picked up by the microphone, electrical signals (audio signals) output from the microphone device include an electrical signal corresponding to the wind noise. Consequently, a frequency characteristic of the microphone device in a low frequency band deteriorates. In this way, the wind noise adversely affects the frequency characteristic of the microphone device. In order to reduce adverse impact on the frequency characteristic due to the wind noise, the microphone device is provided with a windscreen (a windscreen part) for inhibiting the occurrence of the wind noise on an outer portion of the housing to cover the microphone (for example, see JP2012-175379 A).

However, the microphone device continues to be used under the environment where the microphone device is exposed to wind and rain outside the building, and thus the windscreen deteriorates due to hydrolysis with rain and moisture contained in the air. The deterioration hinders the windscreen from inhibiting the occurrence of the wind noise sufficiently and the wind noise may be picked up by the microphone. Therefore, the frequency characteristic of the microphone device in the lower frequency band deteriorates. As the windscreen deteriorates, the windscreen becomes clogged and is unable to pick up desired sound waves (sounds). A microphone device with the deteriorated windscreen may be unable to pick up desired sounds. Thus, the impact on the windscreen caused by the installed environment is an issue in the environment where the microphone device is exposed to wind and rain outside the building.

SUMMARY

The present invention is directed to providing the microphone device with a reduced impact on the windscreen (the windscreen part) caused by the installed environment.

A microphone device according to the present invention includes a microphone that outputs an electrical signal in response to a sound wave, a housing portion that accommodates the microphone, and a windscreen part that reduces a pressure of wind entering into the housing portion, in which the housing portion includes a hollow cylindrical-shaped housing body and a cap attached to one end of the housing body in an axial direction of the housing body, in which the windscreen part is accommodated in the housing body and disposed between the cap and the microphone, the cap is solid and includes a sound guide hole that guides the sound wave to the microphone, in which the sound guide hole is disposed along the axial direction.

The present invention is able to provide the microphone device with a reduced impact on the windscreen (the windscreen part) caused by the installed environment.

DETAILED DESCRIPTION

Embodiments of a microphone device according to the present invention will be described. In the following description, the drawings are referred to as appropriate.

Microphone Device

Configuration of Microphone Device

The embodiments of the microphone device according to the present invention (hereinafter simply referred to as the "present microphone device") will now be described.

Figure 1:
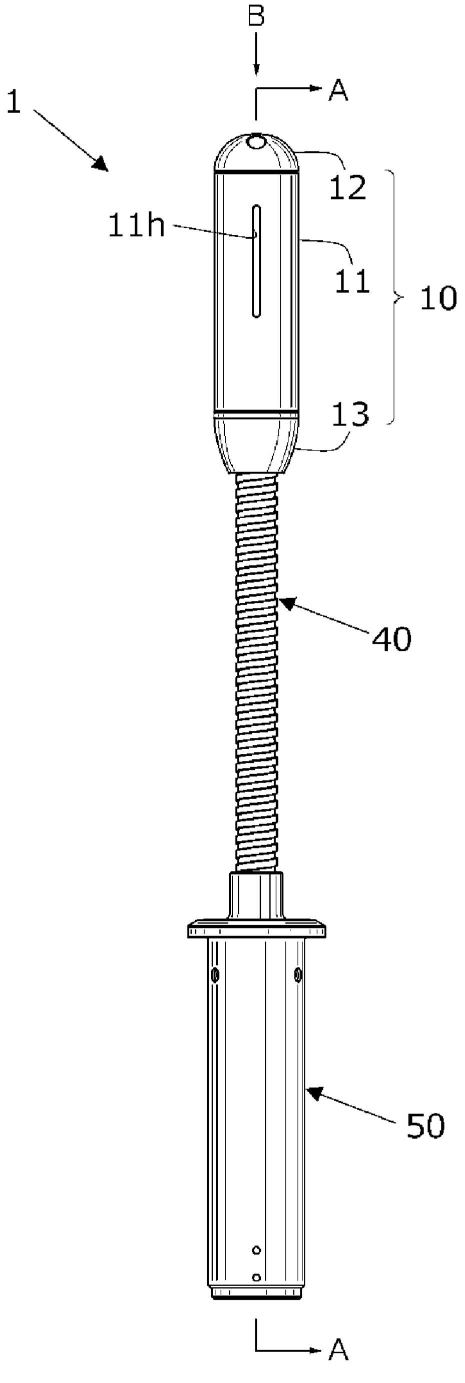
FIG. 1 is an appearance view of a microphone device illustrating an embodiment of the microphone device according to the present invention.
Figure 2:
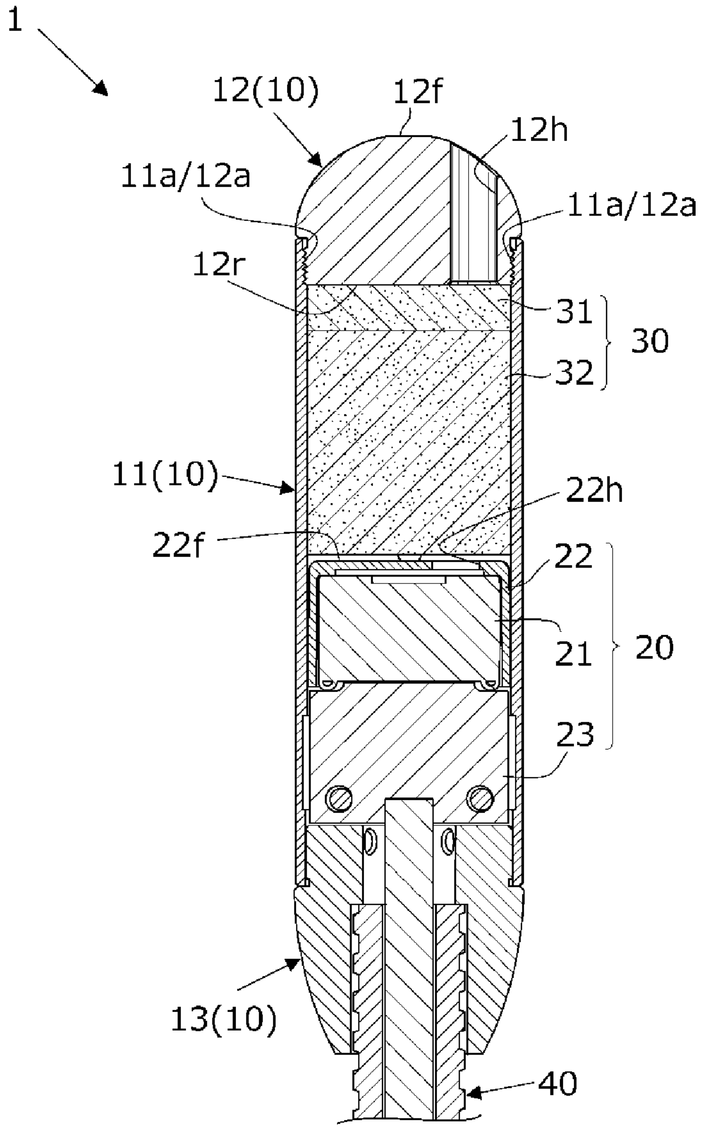
FIG. 2 is a partially enlarged longitudinal section of the microphone device taken along the line A-A in FIG. 1.

FIG. 1 is an appearance view of the present microphone device 1 illustrating the embodiment of the present microphone device 1. FIG. 2 is a partially enlarged longitudinal section of the present microphone device 1 taken along the line A-A in FIG. 1.

The present microphone device 1 picks up a sound wave from a sound source (not illustrated), generates an electrical signal in response to the sound wave, and outputs the generated sound wave. The present microphone device 1 is a narrow directional gooseneck microphone device. The present microphone device 1 is installed outside a building (e.g., near an entrance of the building) and is used for picking up sound waves (voices) and the like emitted by people entering and leaving the building. The present microphone device 1 includes a housing portion 10, a microphone 20, a windscreen part 30, an adjustment portion 40, and a connection portion 50.

The housing portion 10 accommodates the microphone 20 and the windscreen part 30 and protects the microphone 20 and the windscreen part 30 from wind and rain. The housing portion 10 is connected to the adjustment portion 40. The housing portion 10 includes a housing body 11, a cap 12, and a supporting part 13.

In the following description, regardless of the posture of the present microphone device 1, the "front" is a direction in which the cap 12 is located with respect to the housing body 11, and the "rear" is an opposite direction to the front.

The housing body 11 accommodates the microphone 20 and the windscreen part 30. The housing body 11 is a hollow cylindrical-shaped member that is long in the front-rear direction and has openings at front and rear end portions. The housing body 11 is made of metal, for example. The housing body 11 includes an internal thread portion **11*a* and a plurality of (e.g., two) slit openings 11*h***.

In the following description, the "axial direction" is a direction along the central axis of the housing body 11 (the front-rear direction), the "circumferential direction" is a circumferential direction of the housing body 11, and the "radial direction" is a radial direction of the housing body 11.

The internal thread portion 11*a* is an internal thread surface corresponding to an external thread portion 12*a* described later. The internal thread portion 11*a* is disposed on an inner peripheral surface of a front portion of the housing body 11.

The slit opening 11*h* is a hole for introducing sound waves outside the housing portion 10 into the housing body 11 (the housing portion 10). Each slit opening 11*h* is a slit-shaped opening long in the axial direction and the slit openings 11*h* are disposed at equal intervals on the peripheral surface of the housing body 11 in the circumferential direction. The slit opening 11*h* is a through hole that allows the outside and the inside of the housing body 11 (the housing portion 10) to communicate with each other in the radial direction. An acoustic resistance material (not illustrated) that functions as an acoustic resistance for the sound wave passing through the slit opening 11*h* is disposed on the inner peripheral surface of the housing body 11 in such a way as to cover the slit openings 11*h*. The acoustic resistance material is a mesh-like member such as a nonwoven fabric, for example.

Note that, the number of slit openings is not limited to "two" in the present invention. That is, the number of slit openings may be "one" or "three" or more. When the number of slit openings is "three" or more, the slit openings are disposed at equal intervals in the circumferential direction. In the present invention, the plurality of slit openings may be disposed in line in the axial direction of the housing body. The length of the slit opening in the axial direction is set depending on the length of the housing body in the axial direction and a frequency band to be canceled.

The cap 12 protects the microphone 20 from the front. The cap 12 is attached to the front end (one end) of the housing body 11 in the axial direction. The cap 12 is made of solid metal, for example. A front surface 12*f* of the cap 12 is a spherical surface, and a rear surface 12*r* is a flat surface. That is, the cap 12 has a hemispherical convex shape toward the front. The cap 12 includes the external thread portion 12*a* and a plurality (e.g., three) of sound guide holes 12*h* (a first sound guide hole 12*h*1, a second sound guide hole 12*h*2, and a third sound guide hole 12*h*3).

The external thread portion 12*a* is an external thread surface corresponding to the internal thread portion 11*a*. The external thread portion 12*a* is disposed on an outer peripheral surface of a rear portion of the cap 12.

Figure 3:
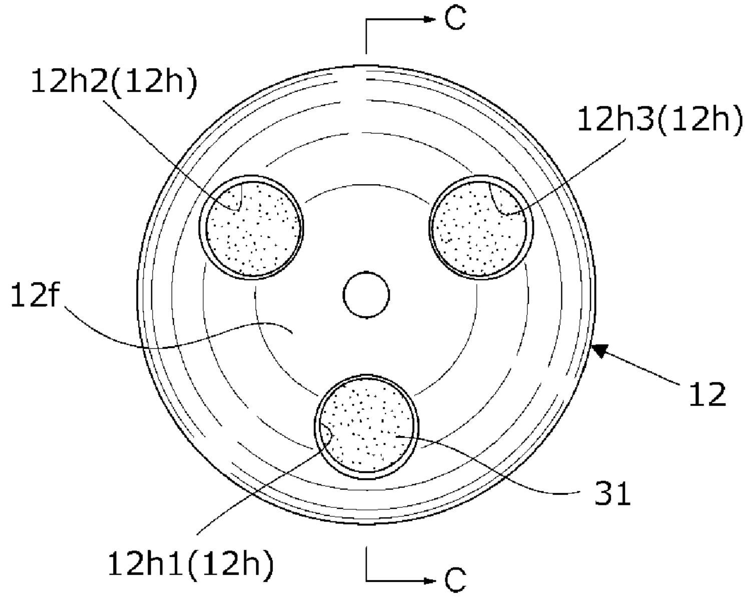
FIG. 3 is a view of the microphone device viewed from the direction illustrated with the arrow B in FIG. 1.

FIG. 3 is a view of the present microphone device 1 viewed from the direction illustrated with the arrow B in FIG. 1. In the figure, the illustration of the connection portion 50 in the present microphone device 1 is omitted. In the following description with reference to FIG. 3, FIGS. 1 and 2 will be referred to as appropriate.

The sound guide hole 12*h* is a hole that introduces a sound wave outside the housing portion 10 into the housing body 11 (the housing portion 10), guides the sound wave to the microphone 20, and introduces wind noise and a pressure of wind (a flow of wind) generated by the wind hitting the present microphone device 1 into the housing body 11 (the housing portion 10). The sound guide hole 12*h* is a cylindrical through hole that is disposed along the axial direction and allows the outside of the cap 12 and the inside of the housing body 11 to communicate with each other. The inner diameter of the sound guide hole 12*h* is uniform from one end to the other. Herein, the sound waves introduced from the sound guide hole 12*h* into the housing body 11 include the sound wave introduced from the axial direction into the housing body 11 and the sound wave coming around from the circumferential direction and introduced into the housing body 11. Among these sound waves, the sound wave coming around from the circumferential direction and introduced into the housing body 11 interferes with the sound wave introduced into the housing body 11 from the slit opening 11*h* and is cancelled. Thus, the sound wave introduced from the sound guide hole 12*h* into the housing body 11 and reaching the microphone 20 is the sound wave introduced from the axial direction into the housing body 11. As a result, the narrow directivity is achieved, and the housing portion 10 (the housing body 11) functions as a sound tube in the present microphone device 1.

The cap 12 includes three sound guide holes (the first to third sound guide holes 12*h*1 to 12*h*3) having the same shape. Each of the first to third sound guide holes 12*h*1 to 12*h*3 passes through the cap 12 along the axial direction. That is, the extending directions of the first to third sound guide holes 12*h*1 to 12*h*3 are parallel to one another in the axial direction. In the circumferential direction, each of the first to third sound guide holes 12*h*1 to 12*h*3 is disposed at equal intervals with a predetermined distance on a concentric circle with the center of the front surface 12*f* of the cap 12 as a center point.

The configuration and shape of the first sound guide hole 12*h*1 are the same as the configuration and shape of each of the second sound guide hole 12*h*2 and the third sound guide hole 12*h*3. Thus, the following description will be given by using the first sound guide hole 12*h*1 as an example. Note that, in the following description, when each of the first to third sound guide holes 12*h*1 to 12*h*3 is not particularly distinguished, each of the first to third sound guide holes 12*h*1 to 12*h*3 is described as "sound guide hole 12*h*".

Figure 4:
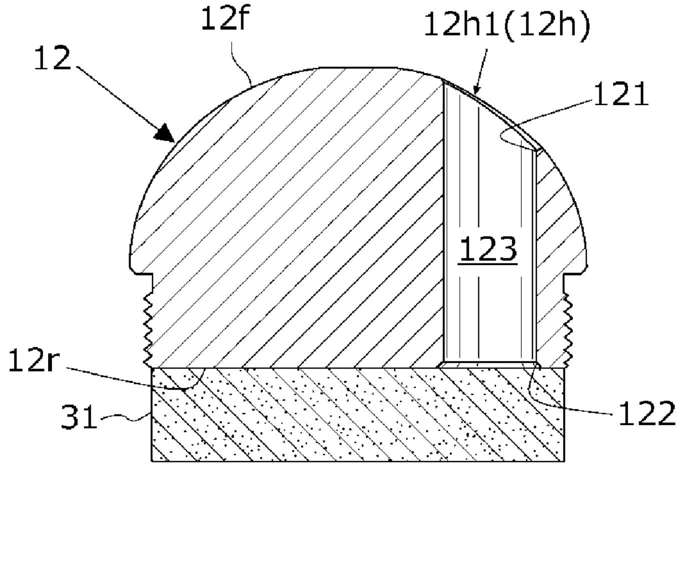
FIG. 4 is a longitudinal sectional view of the microphone device taken along the line C-C in FIG. 3.

FIG. 4 is a longitudinal sectional view of the present microphone device 1 taken along the line C-C in FIG. 3. For convenience of description, only the cap 12 and a first windscreen part 31 (the windscreen part 30) described later are illustrated in the figure. In the following description with reference to FIG. 4, FIGS. 1 to 3 will be referred to as appropriate.

The sound guide hole 12*h* includes a sound wave inlet 121, a sound wave outlet 122, and a sound guide path 123.

The sound wave inlet 121 is an inlet for the sound wave introduced into the sound guide hole 12*h*. The sound wave inlet 121 is an opening disposed on the spherical surface that is the front surface 12*f* of the cap 12.

The sound wave outlet 122 is an outlet for the sound wave from which the sound wave introduced into the sound guide hole 12*h* is led out. The sound wave outlet 122 is an opening disposed on the flat surface that is the rear surface 12*r* of the cap 12.

The sound guide path 123 connects the sound wave inlet 121 to the sound wave outlet 122 and allows the outside of the cap 12 (the housing portion 10) and the inside of the housing body 11 (the housing portion 10) to communicate with each other. The sound guide path 123 is a path for the sound wave.

Herein, as illustrated in FIG. 3, the inner diameter of the sound guide path 123 of the first sound guide hole 12*h*1 is the same as the inner diameter of the sound guide path 123 of the second sound guide hole 12*h*2 and the inner diameter of the sound guide path 123 of the third sound guide hole 12*h*3. That is, in the virtual plane orthogonal to the axial direction, the first to third sound guide holes 12*h*1 to 12*h*3 each have the same cross-sectional area (hereinafter simply referred to as "cross-sectional area of the sound guide hole

12*h*” or “cross-sectional area of each sound guide hole [first to third sound guide holes 12*h*1 to 12*h*3]”).

The supporting part 13 supports the microphone 20 from the rear. The supporting part 13 is attached to the rear end (the other end) of the housing body 11 in the axial direction. The supporting part 13 is made of resin, for example. The front end of the supporting part 13 is disposed inside the housing body 11, and the supporting part 13 is screwed from the outside of the housing body 11, for example.

Referring now back to FIG. 2, the microphone 20 picks up a sound wave from a sound source and generates and outputs an electrical signal in response to the sound wave. The microphone 20 is a condenser microphone, for example. The microphone 20 is accommodated in the housing body 11 and supported by the supporting part 13 from the rear. The microphone 20 includes a microphone unit 21, a unit case 22, and a circuit board 23.

The microphone unit 21 picks up a sound wave from a sound source and generates and outputs an electrical signal in response to the sound wave. The microphone unit 21 is a condenser-type electroacoustic transducer device, for example. The microphone unit 21 is accommodated in the unit case 22 with a sound pickup surface for picking up a sound wave facing toward a below-described closed end portion 22*f* of the unit case 22.

The unit case 22 accommodates the microphone unit 21. The unit case 22 has a hollow cylindrical shape with one end closed and has an opening at the rear end. The unit case 22 includes the closed end portion 22*f* being a front end portion and three unit sound guide holes 22*h*.

The unit sound guide hole 22*h* introduces the sound wave (the sound wave introduced by the sound guide hole 12*h*) led out from the sound wave outlet 122 to the microphone unit 21. The unit sound guide hole 22*h* is a through hole that is disposed at the closed end portion 22*f* and allows the outside and the inside of the unit case 22 to communicate with each other.

The circuit board 23 mounts thereon a circuit such as a balanced transmission circuit (not illustrated) that outputs the electrical signal from the microphone unit 21 to an output connector (not illustrated). The circuit board 23 has a plate shape parallel to the axial direction. A front end of the circuit board 23 is connected to the microphone unit 21, and a rear end of the circuit board 23 is supported by the supporting part 13. The front end of the circuit board 23 is connected with solder to the microphone unit 21, for example. The rear end of the circuit board 23 is screwed to the supporting part 13, for example.

Referring now back to FIGS. 2 and 4, the windscreen part 30 reduces (absorbs) a pressure of wind (a flow of wind) introduced (entered) from the sound guide hole 12*h* into the housing body 11. The windscreen part 30 is disposed in such a way as to be filled between the cap 12 and the microphone 20. That is, the windscreen part 30 is disposed in such a way as to fill a gap between the cap 12 and the microphone 20 inside the housing body 11. Thus, cavity resonance inside the housing body 11 is less likely to occur. The windscreen part 30 includes the first windscreen part 31 and a second windscreen part 32.

The first windscreen part 31 and the second windscreen part 32 reduce the pressure of the wind (the flow of the wind) introduced from the sound guide hole 12*h* into the housing body 11. The first windscreen part 31 is made of synthetic resin such as polyvinyl alcohol (PVA), for example. The second windscreen part 32 is made of open-cell foamed resin such as polyurethane, for example. That is, the second windscreen part 32 is made of materials with lower density than the first windscreen part 31.

The first windscreen part 31 has a solid cylindrical shape that has an outer diameter substantially the same as the inner diameter of the housing body 11 and has a predetermined length (thickness) in the axial direction. The length of the first windscreen part 31 in the axial direction is appropriately set to a length such that the pressure of the wind (the flow of the wind) introduced from the sound guide hole 12*h* into the housing body 11 is reduced (absorbed) but the sound wave introduced from the sound guide hole 12*h* into the housing body 11 is not reduced. In the present embodiment, the first windscreen part 31 has a disk shape being flat in the axial direction. The second windscreen part 32 has a solid cylindrical shape that has an outer diameter substantially the same as the inner diameter of the housing body 11 and the outer diameter of the first windscreen part 31 and has a predetermined length (thickness) in the axial direction. The length of the second windscreen part 32 in the axial direction is appropriately set depending on the length of the housing body 11 in the axial direction (e.g., the length such that a gap between the cap 12 and the microphone 20 is filled with the first windscreen part 31 and the second windscreen part 32). In the present embodiment, the second windscreen part 32 has a solid cylindrical shape with the length in the axial direction being the long side. That is, the length of the second windscreen part 32 is longer than the length of the first windscreen part 31 in the axial direction.

The first windscreen part 31 is disposed at the rear of the rear surface 12*r* of the cap 12 in such a way as to close (cover) the three sound wave outlets 122 (the three sound guide holes 12*h*). That is, the first windscreen part 31 is disposed adjacent to the three sound guide holes 12*h*. In other words, the three sound wave outlets 122 (the three sound guide holes 12*h*) face the first windscreen part 31. The second windscreen part 32 is disposed at the front of the closed end portion 22*f* of the unit case 22 in such a way as to close (cover) the three unit sound guide holes 22*h*. That is, the second windscreen part 32 is disposed adjacent to the three unit sound guide holes 22*h*. In other words, the three unit sound guide holes 22*h* face the second windscreen part 32. Since the cross-sectional area of the housing body 11 is reduced due to the three unit sound guide holes 22*h*, the stiffness of the air in front of a diaphragm included in the microphone unit 21 is increased. The second windscreen part 32 is disposed at the rear of the first windscreen part 31. That is, the first windscreen part 31 is disposed between the cap 12 and the second windscreen part 32, and the second windscreen part 32 is disposed between the first windscreen part 31 and the unit case 22 (the microphone 20).

The outer peripheral surface of the second windscreen part 32 opposes the slit opening 11*h* through an acoustic resistance material. The second windscreen part 32 is accommodated in the housing body 11 in a slightly compressed state between the first windscreen part 31 and the unit case 22 (the microphone 20) in the axial direction. Thus, the gap between the first windscreen part 31 and the unit case 22 (the microphone 20) is filled with the second windscreen part 32.

Referring now back to FIG. 1, the adjustment portion 40 connects the housing portion 10 to the connection portion 50 and also adjusts the position of the housing portion 10 with respect to the connection portion 50. The adjustment portion 40 is a flexible pipe and is able to be bent to adjust the position of the housing portion 10.

The connection unit 50 processes the electrical signal (the audio signal) from the microphone 20 and outputs the processed signal to a connection device (not illustrated) such as a microphone stand.

Method of Assembling Microphone Device

Next, a method of assembling the present microphone device 1 will be described below. In the following description, the description about the assembly of the adjustment portion 40 and the connection portion 50 is omitted.

Figure 5:
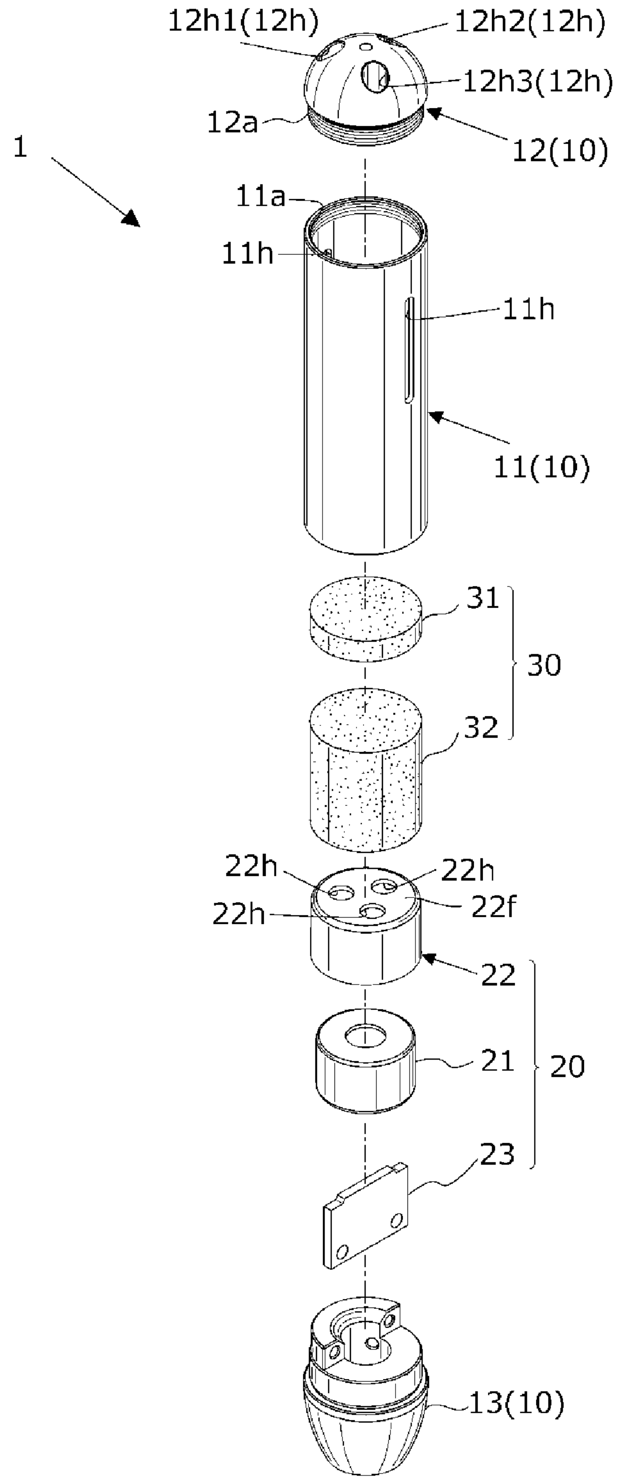
FIG. 5 is a partially exploded perspective view of the microphone device in FIG. 1.

FIG. 5 is an exploded perspective view of the present microphone device 1. In the figure, the illustration of the adjustment portion 40 and the connection portion 50 in the present microphone device 1 is omitted. That is, the figure illustrates an exploded perspective view of the housing portion 10, the microphone 20, and the windscreen part 30. In the following description with reference to FIG. 5, FIGS. 1 to 4 will be referred to as appropriate.

First, the microphone unit 21, the unit case 22, and the circuit board 23 are integrated. Specifically, for example, the microphone unit 21 is accommodated in the unit case 22, and the front end of the circuit board 23 is connected with solder to the microphone unit 21. Thus, the microphone 20 includes the microphone unit 21, the unit case 22, and the circuit board 23 in an integrated manner.

Then, the microphone 20 is attached to the supporting part 13. In this state, the rear end of the circuit board 23 is screwed to the supporting part 13. Thus, the microphone 20 is integrated with the supporting part 13.

Then, the supporting part 13 is attached to the rear end of the housing body 11. Thus, the microphone 20 is accommodated in the housing body 11, and the supporting part 13 is fixed to the housing body 11.

Then, the first windscreen part 31 and the second windscreen part 32 are accommodated in the housing body 11. In this state, first, the second windscreen part 32 is accommodated in the housing body 11 from the front, and then the first windscreen part 31 is accommodated in the housing body 11 from the front.

Then, the cap 12 is attached to the front end of the housing body 11. In this state, the first windscreen part 31 and the second windscreen part 32 are pushed toward the microphone 20 by the rear surface 12*r* of the cap 12. The external thread portion 12*a* of the cap 12 is screwed into the internal thread portion 11*a* of the housing body 11, and thus the cap 12 is fixed to the housing body 11. Thus, the first windscreen part 31 and the second windscreen part 32 are compressed, the first windscreen part 31 closes the three sound guide holes 12*h* (the sound wave outlets 122, see FIG. 4) from the rear, and the second windscreen part 32 closes the three unit sound guide holes 22*h* from the front. In this way, the present microphone device 1 is assembled.

Note that the assembly order of the present microphone device is not limited to the above-described order. That is, for example, the assembly order of the present microphone device may be an order in which, after the microphone is attached to the supporting part, the cap is first attached to the housing body, then the first windscreen part and the second windscreen part are accommodated in the housing body, and then the supporting part is attached to the housing body.

Operation of Microphone Device

Next, operations of the present microphone device 1 will be described. In the following description of the operations of the present microphone device 1, FIGS. 1 to 5 are referred to as appropriate.

As described above, when sound waves are generated from a sound source, only the sound wave introduced into the housing body 11 from the axial direction reaches the microphone 20 among the sound waves introduced into the housing body 11 from the sound guide hole 12*h*. In this case, the sound wave passes through the windscreen part 30 (the first windscreen part 31 and the second windscreen part 32) and is picked up by the microphone unit 21, and the electrical signal in response to the sound wave is output.

Wind noise and a pressure of wind (a flow of wind) generated by the wind hitting the present microphone device 1 are introduced into the windscreen part 30 through the sound guide hole 12*h*. Herein, the generation of wind noise having a frequency characteristic in the middle frequency band (approximately 100 Hz to 800 Hz) among the wind noise and the pressure of the wind (the flow of the wind) generated by the wind hitting the present microphone device 1 is reduced by the hemispherical cap 12. Thus, the pressure of the wind (the flow of the wind) having a frequency characteristic mainly in a low frequency band (approximately 50 Hz to 100 Hz) is introduced into the windscreen part 30.

Herein, an acoustic characteristic of the present microphone device 1 is affected by the length of the sound guide hole 12*h* and the cross-sectional area of the sound guide hole 12*h* (the sum of the cross-sectional areas of the first to third sound guide holes 12*h*1 to 12*h*3). That is, the length and the cross-sectional area of the sound guide hole 12*h* are appropriately set depending on the acoustic characteristic required for the present microphone device 1. When wind is introduced into the sound wave inlet 121 from the outside of the housing portion 10, the cross-sectional area of the sound guide path 123 through which the wind passes is narrower than the three-dimensionally wide external space of the housing portion 10. That is, the wind flows into the hollow cylindrical-shaped narrow space (the sound guide path 123) from the three-dimensionally wide external space of the housing portion 10. That is, the cross-sectional area in the direction perpendicular to the axial direction (travel direction of the wind) is sharply narrowed in the sound guide path 123. In this case, the flow rate of the wind increases and the pressure decreases according to the Bernoulli's theorem. In contrast, the cross-sectional area of the flow path (the housing body 11) through which the wind led out from the sound wave outlet 122 passes is wider than the cross-sectional area of the sound guide path 123. When the flow path through which the wind passes changes from a narrow space to a wide space, the flow rate of the wind decreases and the pressure increases. Such a pressure of the wind is significantly reduced when the wind passes through the first windscreen part 31 with high density. Most of the remaining pressure of the wind is further reduced by the second windscreen part 32 that is less dense than the first windscreen part 31. Thus, sound pickup of the microphone 20 is not affected by the pressure of the wind (the flow of the wind).

Figure 6:
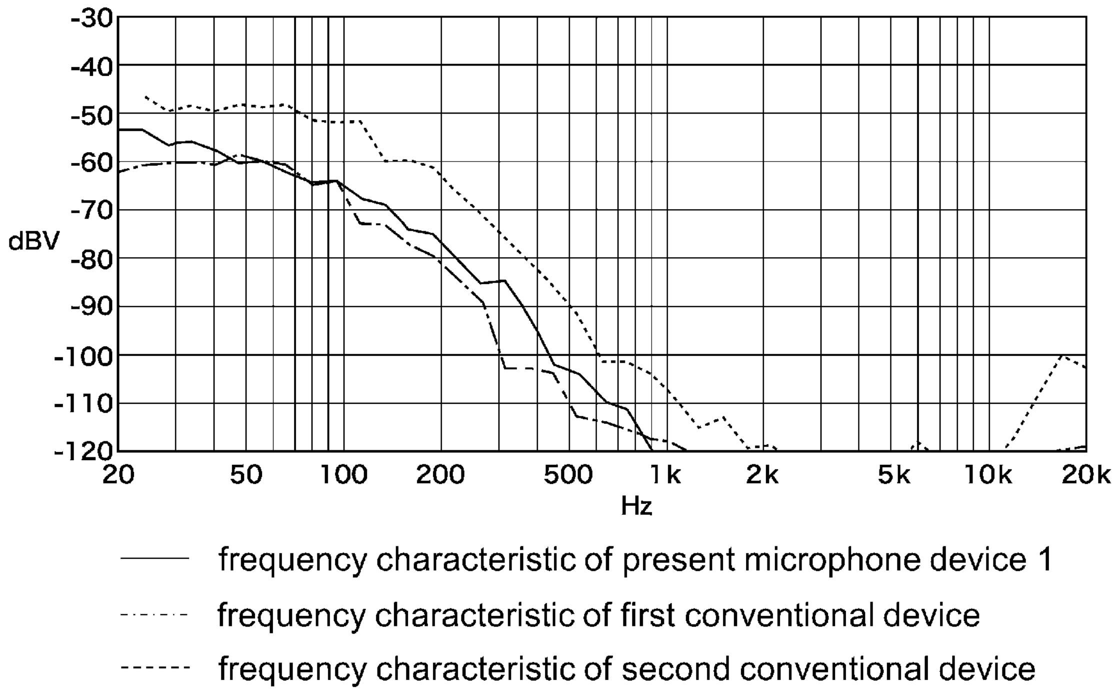
FIG. 6 is a graph illustrating a frequency characteristic of the microphone device in FIG. 1.

FIG. 6 is a graph illustrating a frequency characteristic of the present microphone device 1. The vertical axis in the figure indicates a sound pressure level, and the horizontal axis indicates a frequency. In the figure, the frequency characteristic of the present microphone device 1 in the present embodiment is illustrated with a solid line, a frequency characteristic of a conventional microphone device (hereinafter referred to as "first conventional device") in which a windscreen (a windscreen part) is attached to the outside of the housing is illustrated with a dash-dotted line, and a frequency characteristic of a microphone device (hereinafter referred to as "second conventional device") in which the windscreen is removed from the first conventional device is illustrated with a dashed line.

As illustrated in FIG. 6, the adverse impact on the frequency characteristic due to the pressure of the wind (the flow of the wind) in the present microphone device 1 is reduced in the low frequency band and the middle frequency band as compared with the second conventional device. The present microphone device 1 is able to obtain the frequency characteristic equivalent to that of the first conventional device in the low frequency band. The present microphone device 1 is also able to obtain the frequency characteristic close to that of the first conventional device even in the middle frequency band. That is, the windscreen part 30 provides the function equivalent to that of the conventional windscreen. In other words, the windscreen part 30 functions as a windscreen. In this way, the present microphone device 1 is able to reduce the adverse impact on the frequency characteristic due to the pressure of the wind (the flow of the wind) more than the second conventional device and obtain the frequency characteristic equivalent to or close to that of the first conventional device. Moreover, the windscreen part 30 is accommodated in the housing body 11 (the housing portion 10) in the present microphone device 1, and thus the windscreen is not disposed outside the housing as in the first conventional device. Thus, the present microphone device 1 is reduced in size as compared with the first conventional device. The downsized present microphone device 1 becomes less conspicuous, which is desirable for security measures.

In this way, the present microphone device 1 accommodates the windscreen part 30 (the first windscreen part 31 and the second windscreen part 32) in the housing body 11. Thus, the windscreen part 30 is hardly exposed to wind and rain. As a result, the windscreen part 30 is hardly hydrolyzed by rain and moisture contained in the air and is hardly affected by an installed environment. That is, the windscreen part 30 is less likely to deteriorate as compared with the conventional windscreen. Thus, the windscreen part 30 is able to reduce the pressure of the wind with the function equivalent to that of the conventional windscreen and can also be used for a longer period than the conventional windscreen. In this way, the present microphone device 1 is less susceptible to adverse impact from wind noise and a pressure of wind (a flow of wind), similarly to the first conventional device. The present microphone device 1 is reduced in size and becomes less conspicuous as compared with the first conventional device.

CONCLUSION

According to the embodiment described above, the present microphone device 1 includes the microphone 20, the housing portion 10 that accommodates the microphone 20, and the windscreen part 30 that reduces a pressure of wind. The housing portion 10 includes the housing body 11 and the cap 12 attached to the front end (one end) of the housing body 11. The windscreen part 30 is accommodated in the housing body 11 and is disposed between the cap 12 and the microphone 20. The cap 12 includes the sound guide hole **12*h***.

The sound guide hole **12*h* is disposed along the axial direction. According to this configuration, the windscreen part 30 is accommodated in the housing body 11, and thus the windscreen part 30 is hardly exposed to wind and rain. Thus, the windscreen part 30 is hardly hydrolyzed by rain and moisture contained in the air and is hardly affected by an installed environment. As a result, the windscreen part 30 is less likely to deteriorate as compared with the conventional windscreen. Thus, the windscreen part 30 is able to reduce a pressure of wind with the function equivalent to that of the conventional windscreen and can also be used for a longer period than the conventional windscreen. Thus, the present microphone device 1 is less susceptible to the impact from wind noise and a pressure of wind (a flow of wind), similarly to the first conventional device in which the windscreen is disposed outside the housing. According to this configuration, the windscreen part 30 is accommodated in the housing body 11, and thus the present microphone device 1 is reduced in size as compared with the conventional device. Thus, the downsized present microphone device 1** becomes less conspicuous, which is desirable for security measures.

According to the embodiment described above, the windscreen part 30 is filled in the gap between the cap 12 and the microphone 20. According to this configuration, the space inside the housing body 11 is filled with the windscreen part 30. Thus, cavity resonance inside the housing body 11 is less likely to occur.

According to the embodiment described above, the windscreen part 30 includes the first windscreen part 31 and the second windscreen part 32. A density of the first windscreen part 31 is different from a density of the second windscreen part 32, and the density of the first windscreen part 31 is higher than the density of the second windscreen part 32. According to this configuration, the windscreen part 30 includes the first windscreen part 31 with high density and the second windscreen part 32 with low density, and accordingly the pressure of the wind passing through the sound guide hole **12*h* is significantly reduced by the first windscreen part 31 with high density. Most of the remaining pressure of the wind is further reduced by the second windscreen part 32 that is less dense than the first windscreen part 31**.

According to the embodiment described above, the first windscreen part 31 is disposed adjacent to the sound guide hole **12*h*. The second windscreen part 32 is disposed between the first windscreen part 31 and the microphone 20. According to this configuration, when the wind is introduced from the outside of the housing portion 10 into the sound guide hole 12*h*, the cross-sectional area of the sound guide hole 12*h* through which the wind passes is narrower than the three-dimensionally wide external space of the housing portion 10. The flow rate of the wind passing through the sound guide hole 12*h* increases, and the pressure decreases. In contrast, the cross-sectional area of the flow path (the housing body 11) through which the wind led out from the sound guide hole 12*h* passes is wider than the cross-sectional area of the sound guide hole 12*h*. When the flow path through which the wind passes changes from a narrow space to a wide space, the flow rate of the wind decreases and the pressure increases. When the flow rate of the wind decreases and the pressure increases, the first windscreen part 31 with high density is disposed adjacent to the sound guide hole 12*h*, and thus the pressure of the wind passing through the sound guide hole 12*h* is significantly reduced by the first windscreen part 31. Most of the remaining pressure of the wind is further reduced by the second windscreen part 32 that is less dense than the first windscreen part 31**.

According to the embodiment described above, the housing body 11 includes the slit opening **11*h* disposed on the peripheral surface of the housing body 11. The second windscreen part 32 is disposed in such a way as to oppose the slit opening 11*h*. According to this configuration, among the sound waves introduced from the sound guide hole 12*h* into the housing body 11, the sound wave coming around from the circumferential direction and introduced into the housing body 11 interferes with the sound wave introduced from the slit opening 11***h* into the housing body 11 and is cancelled. Thus, the sound wave introduced from the sound guide hole 12*h* and reaching the microphone 20 is the sound wave introduced into the housing body 11 from the axial direction. As a result, the narrow directivity is achieved, and the housing portion 10 (the housing body 11) functions as a sound tube in the present microphone device 1.

According to the embodiment described above, the length of the second windscreen part 32 is longer than the length of the first windscreen part 31 in the axial direction. The length of the first windscreen part 31 in the axial direction is appropriately set to a length such that the pressure of the wind (the flow of the wind) introduced from the sound guide hole 12*h* into the housing body 11 is reduced (absorbed) but the sound wave introduced from the sound guide hole 12*h* into the housing body 11 is not reduced. In contrast, the length of the second windscreen part 32 in the axial direction is, for example, the length such that the gap between the cap 12 and the microphone 20 is filled with the first windscreen part 31 and the second windscreen part 32. Thus, the sound wave introduced from the sound guide hole 12*h* into the housing body 11 is not reduced, and the pressure of the wind (the flow of the wind) introduced from the sound guide hole 12*h* into the housing body 11 is further reduced.

According to the embodiment described above, the second windscreen part 32 is accommodated in a compressed state between the first windscreen part 31 and the microphone 20. According to this configuration, the second windscreen part 32 is disposed between the first windscreen part 31 and the microphone 20 without any gap. Thus, the pressure of the wind passing through the sound guide hole 12*h* is reduced by the first windscreen part 31 and the second windscreen part 32. The space inside the housing body 11 is filled with the first windscreen part 31 and the second windscreen part 32. Thus, cavity resonance inside the housing body 11 is less likely to occur.

According to the embodiment described above, the sound guide hole 12*h* includes the sound wave outlet 122. The first windscreen part 31 closes the sound wave outlet 122. According to this configuration, when the wind is introduced from the outside of the housing portion 10 into the sound wave inlet 121 (the sound guide hole 12*h*), the cross-sectional area of the sound guide path 123 (the sound guide hole 12*h*) through which the wind passes is narrower than the three-dimensionally wide external space of the housing portion 10. The flow rate of the wind passing through the sound guide hole 12*h* increases, and the pressure decreases. In contrast, the cross-sectional area of the flow path (the housing body 11) through which the wind led out from the sound wave outlet 122 (the sound guide hole 12*h*) passes is wider than the cross-sectional area of the sound guide path 123 (the sound guide hole 12*h*). When the flow path through which the wind passes changes from a narrow space to a wide space, the flow rate of the wind decreases and the pressure increases. When the flow rate of the wind decreases and the pressure increases, the first windscreen part 31 with high density is disposed in such a way as to close the sound wave outlet 122 (the sound guide hole 12*h*), and thus the pressure of the wind passing through the sound guide hole 12*h* is significantly reduced by the first windscreen part 31.

According to the embodiment described above, the sound guide hole 12*h* includes the first sound guide hole 12*h*1 and the second sound guide hole 12*h*2. The inner diameter of the first sound guide hole 12*h*1 is the same as the inner diameter of the second sound guide hole 12*h*2. The acoustic characteristic of the sound guide hole 12*h* is affected by the length of the sound guide hole 12*h* and the sum of the cross-sectional areas of the first sound guide hole 12*h*1 and the second sound guide hole 12*h*2. This configuration also reduces the pressure of the wind appropriately.

According to the embodiment described above, the sound guide hole 12*h* includes the sound wave inlet 121. The cap 12 has the hemispherical convex shape toward the side of the sound wave inlet 121. According to this configuration, the introduction of wind noise having the frequency characteristic in the middle frequency band (approximately 100 Hz to 800 Hz) into the sound guide hole 12*h* is reduced by the hemispherical cap 12.

According to the embodiment described above, the microphone 20 includes the microphone unit 21 and the unit case 22. The unit case 22 includes the unit sound guide hole 22*h*. The unit sound guide hole 22*h* faces the windscreen part 30 (the second windscreen part 32). According to this configuration, the stiffness of the air in front of the diaphragm is increased.

Note that, in the embodiment described above, the windscreen part 30 has a configuration including the first windscreen part 31 and the second windscreen part 32. Alternatively, the windscreen part may include only "one" member of either the first windscreen part or the second windscreen part. In this case, it is desirable that the windscreen part be configured by only the second windscreen part.

Further, the windscreen part may be configured to include "three" or more members to which another windscreen part is added. In this case, the windscreen part may be disposed in an order from the highest density to the lowest density from the front to the rear in such a way that the windscreen part with high density is disposed at the front and the windscreen part with low density is disposed at the rear. Even in the configuration in which the windscreen part includes only the second windscreen part or "three" or more windscreen part, the pressure of the wind can be reduced.

In the present invention, the positions of the first windscreen part and the second windscreen part may be reversed. Even in this case, the pressure of the wind can be reduced.

In the present invention, the sound guide hole 12*h* includes the three sound guide holes (the first to third sound guide holes 12*h*1 to 12*h*3). However, the number of sound guide holes is not limited to "three". That is, for example, the number of sound guide holes may be "one" or "two", or may be "four" or more. As described above, the acoustic characteristic of the sound guide hole functioning as a sound tube is affected by "the length" of the sound guide hole and "the cross-sectional area" of the sound guide hole. "The length" of the sound guide hole and "the cross-sectional area" of the sound guide hole are appropriately set depending on the required acoustic characteristic. Thus, for example, in order to obtain the acoustic characteristic equivalent to the sound guide hole 12*h* in the present invention, when the number of sound guide holes is "one", "the cross-sectional area" and "the length" of the one sound guide hole are the same as "the sum of cross-sectional areas" and "the length" of the sound guide hole 12*h*.

In the present invention, the inner diameter of the sound guide path of the first sound guide hole may be different from the inner diameter of the sound guide path of the second sound guide hole and the inner diameter of the sound guide path of the third sound guide hole. In this case, for example, the sound guide hole having a large diameter in the radial direction of the cap may be disposed at the center of the cap in the radial direction. For example, the sound guide holes having the diameter smaller than the sound guide hole disposed at the center of the cap in the radial direction may be disposed at equal intervals with a predetermined distance in the circumferential direction of the cap. Even in this configuration, the sound guide hole is able to introduce sound waves from a sound source.

In the present invention, the shape of the opening through which the sound wave is introduced into the housing body is not limited to a slit-like shape. That is, the shape of the opening in the present invention may be a shape different from the slit-like shape. That is, the shape of the opening in the present invention may be a hole such as a circle or a polygon, for example.

In the present invention, the shapes of the plurality of openings formed on the housing body may be the same or different from each other.

In the present invention, the plurality of openings formed on the housing body may be disposed along the axial direction of the housing body. Each of the plurality of openings disposed along the axial direction may be disposed on a virtual line of the axial direction. The plurality of openings disposed along the axial direction of the housing body may be disposed at equal intervals or different intervals in the axial direction. The housing body in which a plurality of openings each having the opening with circular or polygonal shape are disposed along the axial direction of the housing body has the same function as the housing body in which the slit-like opening (the slit opening) is formed.

In the present invention, the plurality of openings formed on the housing body may be disposed in the circumferential direction of the housing body. The plurality of openings disposed in the circumferential direction of the housing body may be disposed at equal intervals or different intervals. The shapes and arrangements of the openings of the housing body may be appropriately selected depending on an acoustic characteristic, a productivity, a material of the housing body, a strength of the structure of the housing body, and the like.

What is claimed is:

1. A microphone device comprising:
a microphone configured to output an electrical signal in response to a sound wave;
a housing portion that accommodates the microphone; and
a windscreen part configured to reduce a pressure of wind entering into the housing portion, wherein
the housing portion includes:
a hollow cylindrical-shaped housing body; and
a cap attached to one end of the housing body in an axial direction of the housing body,
the windscreen part is accommodated in the housing body and disposed between the cap and the microphone,
the cap is solid and includes a sound guide hole configured to guide the sound wave to the microphone, wherein
the sound guide hole is disposed along the axial direction,
the windscreen part comprises
a first windscreen part; and
a second windscreen part, wherein
a density of the first windscreen part is different from a density of the second windscreen part,
the density of the first windscreen part is higher than the density of the second windscreen part, the first windscreen part is disposed adjacent to the sound guide hole, and
the second windscreen part is disposed between the first windscreen part and the microphone.

2. The microphone device according to claim 1, wherein the windscreen part is filled between the cap and the microphone.

3. The microphone device according to claim 1, wherein
the housing body includes one or more openings through which the sound wave is introduced into the housing body,
the opening is disposed on a peripheral surface of the housing body, and
the second windscreen part is disposed in such a way as to oppose the opening.

4. The microphone device according to claim 3, wherein
the opening is a slit opening opened in a slit-shaped manner in the axial direction of the housing body.

5. The microphone device according to claim 3, wherein
the plurality of openings is disposed along the axial direction of the housing body.

6. The microphone device according to claim 5, wherein
the plurality of openings is disposed along a virtual line in the axial direction of the housing body.

7. The microphone device according to claim 1, wherein
a length of the second windscreen part is longer than a length of the first windscreen part in the axial direction.

8. The microphone device according to claim 1, wherein
the second windscreen part is accommodated in a compressed state between the first windscreen part and the microphone.

9. The microphone device according to claim 1, wherein
the sound guide hole includes a sound wave outlet through which the sound wave introduced into the sound guide hole is led out, and
the first windscreen part closes the sound wave outlet.

10. The microphone device according to claim 1, wherein
the sound guide hole includes:
a first sound guide hole; and
a second sound guide hole, and
an inner diameter of the first sound guide hole is the same as an inner diameter of the second sound guide hole.

11. The microphone device according to claim 1, wherein
the sound guide hole includes:
a first sound guide hole; and
a second sound guide hole, and
an inner diameter of the first sound guide hole is different from an inner diameter of the second sound guide hole.

12. The microphone device according to claim 1, wherein
the sound guide hole includes a sound wave inlet through which the sound wave is introduced into the sound guide hole, and
the cap has a hemispherical convex shape toward the sound wave inlet side in the axial direction.

13. The microphone device according to claim 1, wherein
the microphone includes:
a microphone unit configured to output the electrical signal in response to the sound wave; and
a unit case that accommodates the microphone unit,
the unit case includes a unit sound guide hole configured to guide the sound wave into the microphone unit, and
the unit sound guide hole faces the windscreen part.

* * * * *